United States Patent [19]

Moyle

[11] 4,364,989
[45] Dec. 21, 1982

[54] SNACK FOOD PACKAGING MATERIAL

[75] Inventor: LaMont E. Moyle, Milford, N.J.

[73] Assignee: Rexham Corporation, New York, N.Y.

[21] Appl. No.: 245,698

[22] Filed: Mar. 19, 1981

[51] Int. Cl.³ .................................................. B32B 7/02
[52] U.S. Cl. ..................................... 428/216; 428/518; 428/520; 428/335; 428/336; 426/126; 426/127; 426/415
[58] Field of Search .............. 428/516, 518, 520, 216, 428/334, 335, 336; 426/126, 127, 415

[56] References Cited

U.S. PATENT DOCUMENTS

| 3,274,004 | 9/1966 | Curler et al. | 426/127 |
| 3,328,196 | 6/1967 | Sincock | 426/127 |
| 3,539,439 | 11/1970 | Caldewood et al. | 428/518 |
| 3,558,399 | 1/1971 | Turner | 156/308 |
| 4,096,309 | 6/1978 | Stillman | 426/126 |

Primary Examiner—Marion McCamish
Assistant Examiner—E. Rollins Buffalow
Attorney, Agent, or Firm—Mandeville and Schweitzer

[57] ABSTRACT

The disclosure relates to a multi-layer snack food packaging material particularly suitable for forming potato chip bags and the like. The material comprises an outer layer of polypropylene, a low density polyethylene laminator and an inner layer which is, itself, a coextrusion. The inner coextruded layer comprises a first layer of high density polyethylene, a second layer of polypropylene and a third layer of ethylene methyl acrylate. The ethylene methyl acrylate is coated with an emulsion of polyvinylidene chloride, which seals the inner layers together upon application of heat. The package has many advantageous characteristics for use in snack food packaging and does not require glassine. The material has excellent oxygen and moisture barrier properties, good stiffness, good grease resistance and bond strength appropriate for easy opening by the consumer.

11 Claims, 5 Drawing Figures

SNACK FOOD PACKAGING MATERIAL

BACKGROUND OF THE INVENTION

Materials to be used in the packaging of snack foods and the like must have certain important technical properties. For instance, it is desirable that snack food packages be grease resistant, especially where items such as potato chips are to be contained therein. Another important property is spoilage inhibition. The bag must contain an effective oxygen barrier to prevent spoilage of the food by oxidation and it may be lined with opaque materials, which help to prevent spoilage by sunlight. Furthermore, there must be an effective moisture barrier to prevent damage to the food from moisture.

The successful snack package will have a certain degree of stiffness to protect the food and give the bag a desirable shape. In addition, the bond strength of the material must be such that the package will not rupture prematurely yet can be opened by the consumer with the exertion of a resonable amount of force. Also, the packaging material should be appropriate for decoration and for displaying information about the product, so that consumers will be attracted to it.

Certain widely used prior snack packaging materials have utilized glassine in combination with layers of plastic materials. One such material is known commercially as Rex-Lam 400P, marketed by Rexham Corporation, New York, N.Y. This material comprises an outside layer of polypropylene laminated with polyethylene to an inner layer of glassine. The glassine is coated on the inside with an emulsion of polyvinylidene chloride, which acts as a heat sealant. While the Rex-Lam 400P has appropriate properties for use in a snack food pacakage, it has become desirable to eliminate the glassine due to decreased availability and increased cost.

SUMMARY OF THE INVENTION

In accordance with the invention, an improved packaging material is provided, which is especially suitable for containing snack materials, such as potato chips. The new material comprises an outer layer of polypropylene laminated with white opaque low density polyethylene to an inner layer formed of a composite coextrusion. The exposed surface of the composite coextrusion is coated with an emulsion of polyvinylidene chloride. The composite coextrusion comprises a first layer of white opaque high density polyethylene, a middle layer of chocolate polypropylene and an inner layer of ethylene methyl acrylate. When a package is formed from this material, the polypropylene is on the outside and the coating of polyvinylidene chloride is on the inside. The polyvinylidene chloride acts as a heat seal medium.

The packaging material of the invention has excellent properties for use in the packaging of snack foods. It has high grease resistance and an excellent oxygen barrier. The package is opaque and has good moisture barrier properties and a good degree of stiffness. The heat seal bond is excellent, yet the package may be opened with the application of reasonable force by a consumer. The material is well suited for decoration to enhance its attractiveness to the customer. In fact, the structure of the packaging material of the invention includes the use of two layers of white opaque polyethylene lying side by side. This results in a "whiter" and more pleasing color for the bag.

For a more complete understanding of the above and other features and advantages of the invention, reference should be made to the following detailed description of a preferred embodiment and to the accompanying drawings.

DETAILED DESCRIPTION OF THE INVENTION

Figure 1:
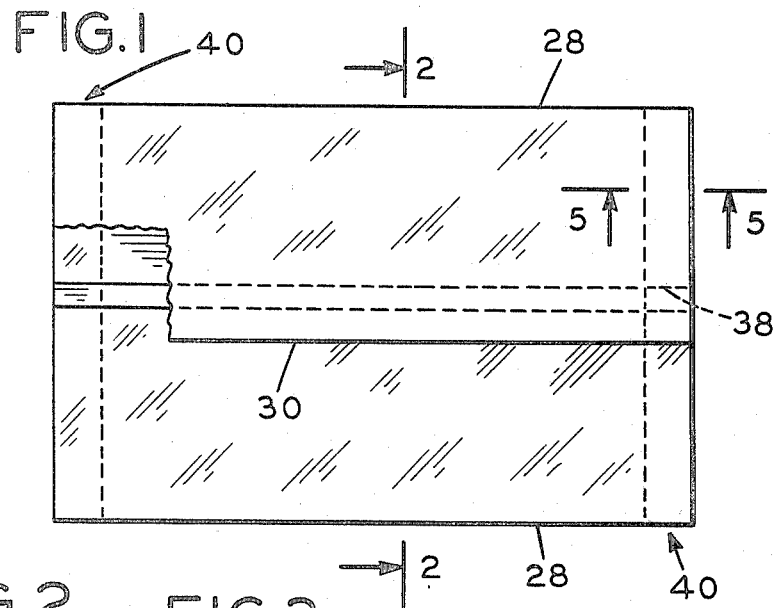
FIG. 1 is a top plan view of an empty snack package made with the packaging material of the invention.
Figures 2, 3:
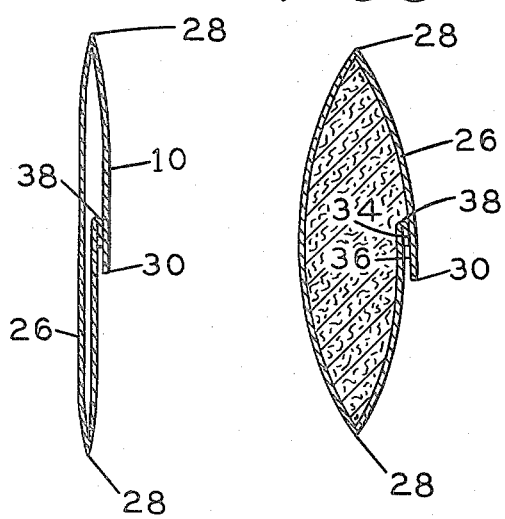
FIG. 2 is a cross section along the lines 2—2 of the package of FIG. 1.
FIG. 3 is a cross section corresponding to that of FIG. 2 except that the snack package according to the invention is filled.
Figure 5:
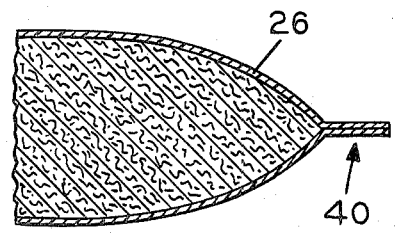
FIG. 5 is a cross section corresponding to the section 5—5 of FIG. 1 except that the package of the invention is filled.

Referring to the drawings, the outside layer 10 is uncoated oriented polypropylene. Decorative or other material to appear on the package may be reverse printed on the side of the polypropylene which faces the next layer, 12. The outer polypropylene film layer may range from about 1.00 to about 0.25 mils thickness, although around 0.45 mils is preferred. The polypropylene layer is laminated with a polyethylene laminant 12 to the multi-layer composite coextrusion, which comprises three layers, 14, 16 and 18. The laminant layer 12 is low density polyethylene to which white concentrate pigment has been added to impart color and opacity. The white opaque low density polyethylene may be used in the range of from about 5 to about 15 pounds per ream.

The composite film to which the outer polypropylene layer is laminated, comprises a coextrusion of three layers. The first is a layer of white pigmented high density polyethylene 14 which ranges in thickness from 0.2 to 2.0 mils, preferably about 1 mil. It should be noted that use of this white opaque polyethylene, in addition to the white polyethylene laminator, results in a whiter and cleaner appearance for the package. The middle layer of the composite coextrusion is a 0.2 to 2.0 mil thick film of non-oriented polypropylene 16, which may be pigmented chocolate, for example. Film 16 preferably has a thickness of 1 mil. The third layer, 18, is preferably a 0.2 mil film of ethylene methyl acrylate. The thickness of layer 18 may range from 0.2–0.5 mil. The overall thickness of the composite coextrusion may range from 1.5–2.5 mils, preferably around 2.2 mils.

An emulsion 20 of polyvinylidene chloride is coated upon the layer of ethylene methyl acrylate on the side opposite to that which faces the polypropylene layer 16. The polyvinylidene chloride may be used in the range of 2–5 lbs. per ream. During application, the polyvinylidene chloride may be diluted with ethanol to increase the wetting of the ethylene methyl acrylate surface by the emulsion. Advantageously, the ethanol constitutes approximately 10% by volume of the polyvinylidene chloride-ethanol mixture. Other alcohols such as propanol can also be used. In addition, Corona discharge may also be used in place of the alcohols.

The application of the polyvinylidene chloride to the ethylene methyl acrylate results in a greatly enhanced oxygen barrier as compared to the barrier formed when an equivalent amount of polyvinylidene chloride is applied to a glassine layer. This results in economies both of time and of money, since, in prior packages, the higher $O_2$ permeability through the polyvinylidene chloride-glassine bond necessitated application of larger amounts of polyvinylidene chloride. The extra polyvinylidene chloride was applied in a second step or "bump" which in turn required an extra drying step. The material of the instant invention permits application of the polyvinylidene chloride in one less step with a concomitant saving of time and chemicals and still results in a better oxygen barrier.

Figure 4:
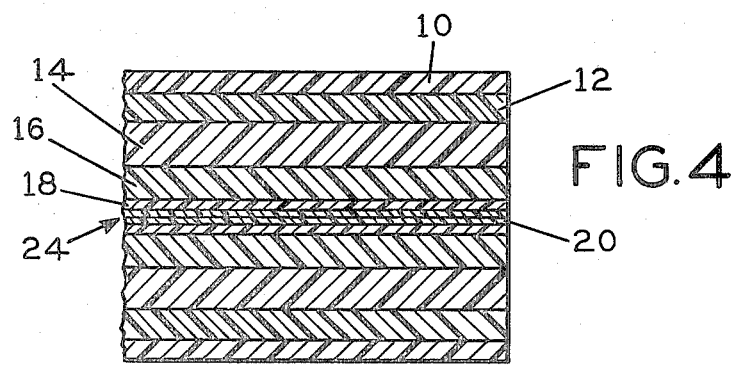
FIG. 4 is a cross sectional view of two composite sheets of the packaging material of the invention sealed together.

The polyvinylidene chloride acts as a heat sealant. In the formation of the package, two polyvinylidene coated ethylene methyl acrylate surfaces are placed facing each other and then heat is applied. The area of the seal is generally designated 24 in FIG. 4.

The packaging material of the invention may be used in the manufacture of a snack package such as the one shown in FIGS. 1, 2, 3 and 5. The package comprises a sheet 26 which has been folded over itself to form a flattened tube. The fold lines are designated 28. The leading edge 30 of the folded-over sheet overlaps a portion of the sheet below. The overlapped portion is folded back as at 38 so that the polyvinylidene coated ethylene methyl acrylate inner surface 34 of the overlapped sheet faces the polyvinylidene chloride coated ethylene methyl acrylate inner surface 36 of the overlapping sheet. This permits heat sealing of the polyvinylidene chloride coating. The tops and bottoms of the bag are heat sealed as indicated at 40 where the polyvinylidene chloride coated surfaces face each other.

EXAMPLE

Film A was prepared in accordance with the principles of the invention. A 0.45 mil layer of Hercules B-523 uncoated, oriented, reverse printed polypropylene was extrusion laminated to a 2.2 mil layer of composite coextrusion by means of intervening white opaque low density polyethylene. The B-523 may be obtained from Hercules, 110 Market Street, Wilmington, Del. The low density polyethylene was Gulf Chemical 1017 with white concentrate added. Gulf chemicals are available from Gulf Oil Chemicals Co., P.O. Box 3766, Houston, Texas 77001. In this case, ten pounds per ream of the low density polyethylene was used.

The composite coextrusion comprised 1 mil of white high density polyethylene (Gulf Chemical 9634 with white pigment added), 1 mil of chocolate non-oriented polypropylene (Gulf Chemical 6314, pigmented chocolate) and 0.2 mils of ethylene methyl acrylate (Gulf Chemical PE 2255). The composite film was, of course, separately coextruded prior to lamination. After lamination, the ethylene methyl acrylate layer of the composite coextrusion was coated on its exposed side. The coating comprised a Union Chemicals Division polyvinylidene chloride emulsion PVDC M3-153 (primerless Saran) diluted with 99% ethanol. The ethanol constituted 8% by volume of the ethanol-polyvinylidene chloride mixture. Union Chemicals is located at 1345 North Meacham Road, Schaumburg, Ill. Three pounds per ream of the polyvinylidene chloride were coated onto the ethylene methyl acrylate. A package was formed from Film A by heat sealing the polyvinylidene chloride.

Film B comprised 0.45 mil oriented polypropylene film laminated with 14 lbs. per ream white opaque low density polyethylene to a 25 lbs. per ream layer of chocolate glassine. The non-laminated side of the glassine was coated with 5 lbs. per ream polyvinylidene chloride. A package was formed from Film B using the polyvinylidene chloride as a heat sealant.

Film C comprised 0.45 mil oriented polypropylene film laminated with 10 pounds per ream white opaque low density polyethylene to a 2.0 mil layer of high density polyethylene film. The non-laminated side of the polyethylene was coated with 3 pounds per ream polyvinylidene chloride. The surface of the polyethylene to be coated with Saran was treated by Corona discharge prior to coating. A package was formed from Film C using the polyvinylidene chloride as heat sealant. The chemicals used in Films B and C were obtained from the same sources as for Film A.

| DATA PROPERTY | FILM A | FILM B | FILM C |
|---|---|---|---|
| PHYSICAL PROPERTIES | | | |
| Total Basis Weight - #/Ream | 50.8 | 48.8 | 57.5 |
| Gauge (Total Mils) | 3.3 | 2.8 | 3.8 |
| Tensile Strength at Break (MD/CD) psi | 6300/6000 | 10,700/8200 | 5400/7200 |
| Elongation at break (MD/CD) % | 73/63 | 9/18 | 117/32 |
| Tear Notched (MD/CD) | 44/87 | 38/40 | 53/97 |
| Taber Stiffness (MD/CD) | 0.4/0.4 | 0.4/0.4 | 0.6/0.8 |
| 1% Secant Modulus | 158M/161M | Not appropriate | 124M/161M |
| Bond Strength, Plies & Coatings | Good | Good | Poor |
| MACHINING PROPERTIES | | | |
| Seal Strength (26 psi, 0.5 Sec.) | | | |
| Temp °F. | Lbs./Inch Initial Peel | Lbs./Inch Initial Peel | Lbs./Inch Initial Peel |
| 175 | 0.0/0.0 | 0.0/0.0 | 0.1/0.0 |
| 200 | 0.1/0.0 | 0.0/0.0 | 0.1/0.1 |
| 225 | 1.2/0.7 | 0.8/0.7 | 0.2/0.2 |
| 250 | 1.6/1.4 | 1.2/0.8 | 0.3/0.2 |
| 275 | 1.7/1.4 | 1.2/0.8 | 0.3/0.2 |
| 300 | 1.7/1.3 | 1.3/0.9 | 0.4/0.2 |
| 325 | Distortion | Distortion | Distortion |
| Oxygen Transmission cc/100 in²./24 hr. | 4.55* | 17.10 | 6.71 |
| Light Transmission (avg. 100,200,500 F.C.) % | 7.6 | 7.3 | 29.2 |
| COF Slip HS Ctg. | | | |
| Self | .43 | .49 | .38 |
| Steel | .24 | .19 | .21 |
| OBV Ctg. | | | |
| Self | .42 | .37 | .32 |
| Steel | 0.20 | 0.19 | .20 |
| WVTR G/100 in²./24 hr. 100° F./90% R.H. | | | |
| Flat | 0.116 / 0.116 / 0.116 | 0.210 / 0.210 / 0.210 | 0.100 / 0.100 / 0.100 |
| Mod Crease | 0.116 / 0.116 / 0.116 | 0.210 / 0.212 / 0.211 | 0.100 / 0.100 / 0.100 |
| Bag Panels (Mira Pak) | 0.116 / 0.116 / 0.116 | 0.233 / 0.229 / 0.231 | 0.100 / 0.100 / 0.100 |

| DATA PROPERTY | FILM A | FILM B | FILM C |
|---|---|---|---|
| Pouches | 0.115 | 0.240 | 0.093 |
| | 0.116 | 0.240 | 0.092 |
| | 0.116 | 0.240 | 0.093 |

*This figure is the average of the results of two trials (6.45 and 2.65) taken under the same conditions. One of the trials was taken at the same time as the trial for Film B and the other at the same time as that for Film C. Except for Film B, the differences in the results are considered minor. The value obtained for Film B, however, indicates significantly inferior oxygen barrier properties.

As is apparent from the above data, the packaging material of the invention has many desirable characteristics. The taber stiffness of the film of the invention is comparable to that of the glassine containing material, although somewhat less than that of Film C. The results of the 1% secant modulus test, which is an important measure of the stiffness of the film, also indicate that Film A has good stiffness characteristics, better, in fact, than Film C.

As indicated in the chart, the bond strength of Film A is good, as is that of Film B. The bond strength of Film C is poor; Film C's bond strength is too low for a useful packaging material. Similarly, the seal strength of the new packaging material reported in the example above is excellent in that the seal is strong enough to preserve the integrity of the package but not so strong as to prevent easy opening by the consumer. In contrast, the seal strength of Film C is too low for that of a practical packaging material.

The data reveals that the oxygen transmission characteristics of Film A are considerably superior to those of Film B, notwithstanding that less PVDC and less application time is required. Film C's oxygen transmission is similar to that of film A. The light transmission of Film A is roughly comparable to that of Film B.

As seen from the WVTR data, the packaging material of the invention has improved moisture barrier characteristics compared to the standard product, Film B. Film C has an even stronger water barrier; however, this is of little consequence since Film C is not an acceptable packaging material because of its bonding and sealing strength.

As is apparent from the data, the packaging material of the invention has outstanding packaging characteristics and is particularly suitable for containing snack foods. It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A flexible, heat sealable packaging material which comprises a lamination of
   (a) an outer film of polypropylene,
   (b) a laminate of low density polyethylene, and
   (c) an inner coextruded film which includes a coextrusion of high density polyethylene, polypropylene and ethylene methyl acrylate, said ethylene methyl acrylate having a coating of a polyvinylidene chloride emulsion on its exposed surface.

2. The packaging material according to claim 1, wherein the low density polyethylene is pigmented white.

3. The packaging material according to claim 2, wherein the high density polyethylene is pigmented white.

4. The packaging material according to claim 1, wherein
   (a) said outer film has a thickness within the range of about 1.00 mils to about 0.25 mils, and
   (b) said inner film has a total thickness within the range of from about 1.5 mils to about 2.5 mils.

5. The packaging material according to claim 4, wherein
   (a) said outer film has a thickness of approximately 0.45 mils, and
   (b) said inner film has a total thickness of approximately 2.2 mils.

6. The packaging material according to claim 1, wherein
   (a) said high density polyethylene portion of said inner film has a thickness within the range of 0.2 to 2.0 mils,
   (b) said polypropylene portion of said inner coextruded film has a thickness within the range of 0.2 to 2.0 mils, and
   (c) said ethylene methyl acrylate portion of said inner film has a thickness within the range of 0.2 to 0.5 mils.

7. The packaging material according to claim 6, wherein
   (a) said high density polyethylene portion of said inner film has a thickness of approximately 1 mil,
   (b) said polypropylene portion of said inner coextruded film has a thickness of approximately 1 mil, and
   (c) said ethylene methyl acrylate portion of said inner film has a thickness of approximately 0.2 mils.

8. The packaging material according to claim 1, wherein the polypropylene in the inner coextruded film is pigmented chocolate.

9. The packaging material according to claims 1, 3 or 6, wherein the polypropylene of the outer film is oriented polypropylene.

10. A snack food package which comprises a lamination of
    (a) an outer film of polypropylene,
    (b) a laminate of low density polyethylene, and
    (c) an inner coextruded film which includes a coextrusion of high density polyethylene, polypropylene and ethylene methyl acrylate, said ethylene methyl acrylate having a coating of polyvinylidene chloride emulsion on its exposed surface,
    (d) said package being formed at least in part by heat sealing a first portion of ethylene methyl acrylate inner layer to a second portion of ethylene methyl acrylate inner layer by bonding together the polyvinylidene chloride coatings of said first and second portions.

11. The packaging material according to claim 10, wherein the outer film of polypropylene is oriented polypropylene.

* * * * *